United States Patent [19]
Lean et al.

[11] Patent Number: 6,079,814
[45] Date of Patent: Jun. 27, 2000

[54] INK JET PRINTER HAVING IMPROVED INK DROPLET PLACEMENT

[75] Inventors: Meng H. Lean, Briarcliff Manor; Vittorio R. Castelli, Yorktown Heights; Joannes N. M. deJong, Suffern; Lloyd A. Williams, Mahopac, all of N.Y.

[73] Assignee: Xerox Corporation, Stamford, Conn.

[21] Appl. No.: 08/883,988

[22] Filed: Jun. 27, 1997

[51] Int. Cl.[7] ..................................... B41J 2/06
[52] U.S. Cl. ............................................. 347/55
[58] Field of Search ................... 347/55, 15, 34, 347/104, 76, 77; 271/193

[56] References Cited

U.S. PATENT DOCUMENTS

| | | | |
|---|---|---|---|
| 4,357,613 | 11/1982 | Wiley et al. | 347/90 |
| 4,379,301 | 4/1983 | Fischbeck | 346/1.1 |
| 4,386,358 | 5/1983 | Fischbeck | 346/1.1 |
| 4,442,439 | 4/1984 | Mizuno | 347/74 |
| 4,697,196 | 9/1987 | Inaba et al. | 347/127 |
| 4,827,295 | 5/1989 | Dean, II et al. | 347/154 |
| 5,124,729 | 6/1992 | Nakazawa et al. | 347/55 |
| 5,298,926 | 3/1994 | Fukushima et al. | 347/34 |
| 5,531,436 | 7/1996 | Ohyama et al. | 271/275 |
| 5,598,195 | 1/1997 | Okamoto et al. | 347/55 |
| 5,754,194 | 5/1998 | Endo et al. | 347/15 |
| 5,781,218 | 7/1998 | Wakahara et al. | 347/55 |
| 5,821,968 | 10/1998 | Ohyama et al. | 347/104 |
| 5,838,349 | 9/1998 | Choi et al. | 347/55 |

FOREIGN PATENT DOCUMENTS

| | | | |
|---|---|---|---|
| 0473178 | 3/1992 | European Pat. Off. | |
| 3-51369 | 5/1981 | Japan | B41J 3/04 |
| 56-051369 | 5/1981 | Japan | |
| 4-62881 | 6/1993 | Japan | B65H 5/00 |
| 4-53081 | 2/1995 | Japan | B65H 5/00 |

*Primary Examiner*—John Barlow
*Assistant Examiner*—Michael S Brooke
*Attorney, Agent, or Firm*—Robert A. Chittum

[57] ABSTRACT

A droplet-on-demand ink jet printer uses electrostatic tacking of a recording medium, such as paper, to achieve simultaneously precise holding of an aligned recording medium on a dielectric surface of a transport belt, thereby providing precise motion quality of the recording medium relative to the printer's printhead, and improved ink droplet placement on the recording medium. The transport belt is electrostatically charged with a charge of one polarity, so that an electrostatic pressure is generated which precisely holds the recording medium in an aligned position on the transport belt, after it is fed thereon, and concurrently induces a charge of opposite polarity on the ink droplets ejected by the printhead, thereby accelerating the droplets toward the recording medium. The accelerated droplets reduce transverse forces on the droplets, such as transverse airflows, and placement errors caused by the repulsion of incoming droplets by previously printed images are further reduced by migration of the charges of the printed droplets through the recording medium and consequent charge cancellation, so that droplet placement is improved.

11 Claims, 5 Drawing Sheets

INK JET PRINTER HAVING IMPROVED INK DROPLET PLACEMENT

BACKGROUND OF THE INVENTION

This invention relates to ink jet printing and more particularly to an ink jet printer having improved ink droplet placement during printing of an image by the printer's droplet-ejecting printhead on a recording medium which is electrostatically tacked to a dielectric transport belt.

Conventional ink jet printing systems use various different methods to produce ink droplets directed toward a recording medium. Well known devices for ink jet printing include thermal, piezoelectric, and acoustic ink jet printheads. All of these technologies produce roughly spherical ink droplets having a 15–100 μm diameter directed toward a recording medium at approximately 4 m/sec. The ejecting transducers or actuators in the printheads, which produce the ink droplets, are controlled by a printer microcomputer or controller. The printer controller activates the transducers or actuators in conjunction with movement of the recording medium relative to the printhead. By controlling the activation of the transducers or actuators and the recording medium movement, the printer controller directs the ink droplets to impact the recording medium in a specific pattern, thus forming an image on the recording medium.

All droplet-on-demand type printheads produce ink droplets theoretically directed toward the recording medium in a direction perpendicular thereto. In practice, however, some ink droplets are not directed exactly perpendicular to the recording medium. The ink droplets which deviate from the desired trajectory are undesirable since such misdirected droplets impact the recording medium at a location not anticipated by the printer controller. Therefore, misdirected droplets affect the quality of the printed image by impacting the recording medium in unwanted positions.

U.S. Pat. No. 4,386,358 and U.S. Pat. No. 4,379,301 disclose a method for electrostatically deflecting electrically charged ink droplets ejected from an ink jet printhead. Charges placed on electrodes on the printhead, as disclosed herein, are controlled to steer the charged ink droplets in desired directions to compensate for known printhead movement. By electrostatically steering the charged ink droplets, the method disclosed in these patents compensates for ink droplet misdirection caused by the known printhead movement when the ink droplet is ejected. However, the electrostatic deflection method disclosed in these patents does not compensate for unanticipated or unpredictable factors, which can affect ink droplet trajectories.

U.S. patent application Ser. No. 08/480,977 filed Jun. 7, 1995 entitled "Electric-Field Manipulation of Ejected Ink Drops in Printing" and assigned to the same assignee as the present invention, discloses electrodes behind the recording medium and/or on the printhead face to induce charges on the ejected ink droplets and accelerate them toward the recording medium. By appropriately controlling the electrostatic deflection of the ink droplets created by each column of actuators in the printhead, the droplets are selectively directed to impact the recording medium at positions both left and right of a center position, so that each actuator can create up to three vertical print columns of spots on the recording medium, thus enhancing the printing resolution of the device.

U.S. patent application Ser. No. 08/721,290 filed Sep. 26, 1996 entitled "Method and Apparatus for Moving Ink Drops Using an Electric Field" and assigned to the same assignee as the present invention, and discloses a method to reduce the input energy required for droplet ejection and thus reduce printhead operating temperature. This is achieved by using an optimal electric field to accelerate the droplets subsequent to ejection. An important advantage is the reduction in power consumed, and the resulting prolonged useful lifetime of the printhead. The optimal electric field also accelerates both main drops and satellite droplets toward the print medium, so that they arrive at the same time.

SUMMARY OF THE INVENTION

It is an object of the invention to use an electrostatic attractive force to hold the recording medium to the transport belt, which moves the recording medium past the printhead for receipt of image forming ink droplets thereon. The electrostatic attractive force achieves precise motion quality of the recording medium relative to the printhead and concurrently uses the electrostatic effects to improve ink droplet placement and image quality.

In one aspect of the present invention, there is provided an ink jet printer having improved ink droplet placement on a recording medium during printing of an image thereon, comprising: a printhead having an aperture plate with a plurality of apertures therein which confront the recording medium and means for ejecting droplets from the apertures toward the recording medium; a transport belt having a dielectric surface for transporting the recording medium past the printhead aperture plate at a fixed distance therefrom; means for placing an electrostatic charge on a portion of the dielectric surface of the transport belt; and means for feeding the recording medium into registration on the electrostatically charged portion of the transport belt for the electrostatic tacking of the recording medium thereon, the electrostatic charge on the transport belt concurrently inducing a charge on ejected ink droplets thereby accelerating the ink droplets toward the recording medium without previously printed images affecting the ink droplet trajectories.

BRIEF DESCRIPTION OF THE DRAWINGS

The present invention will now be described by way of example with reference to the accompanying drawings, wherein like reference numerals refer to like elements, and in which.

DESCRIPTION OF THE PREFERRED EMBODIMENT

Figure 1:
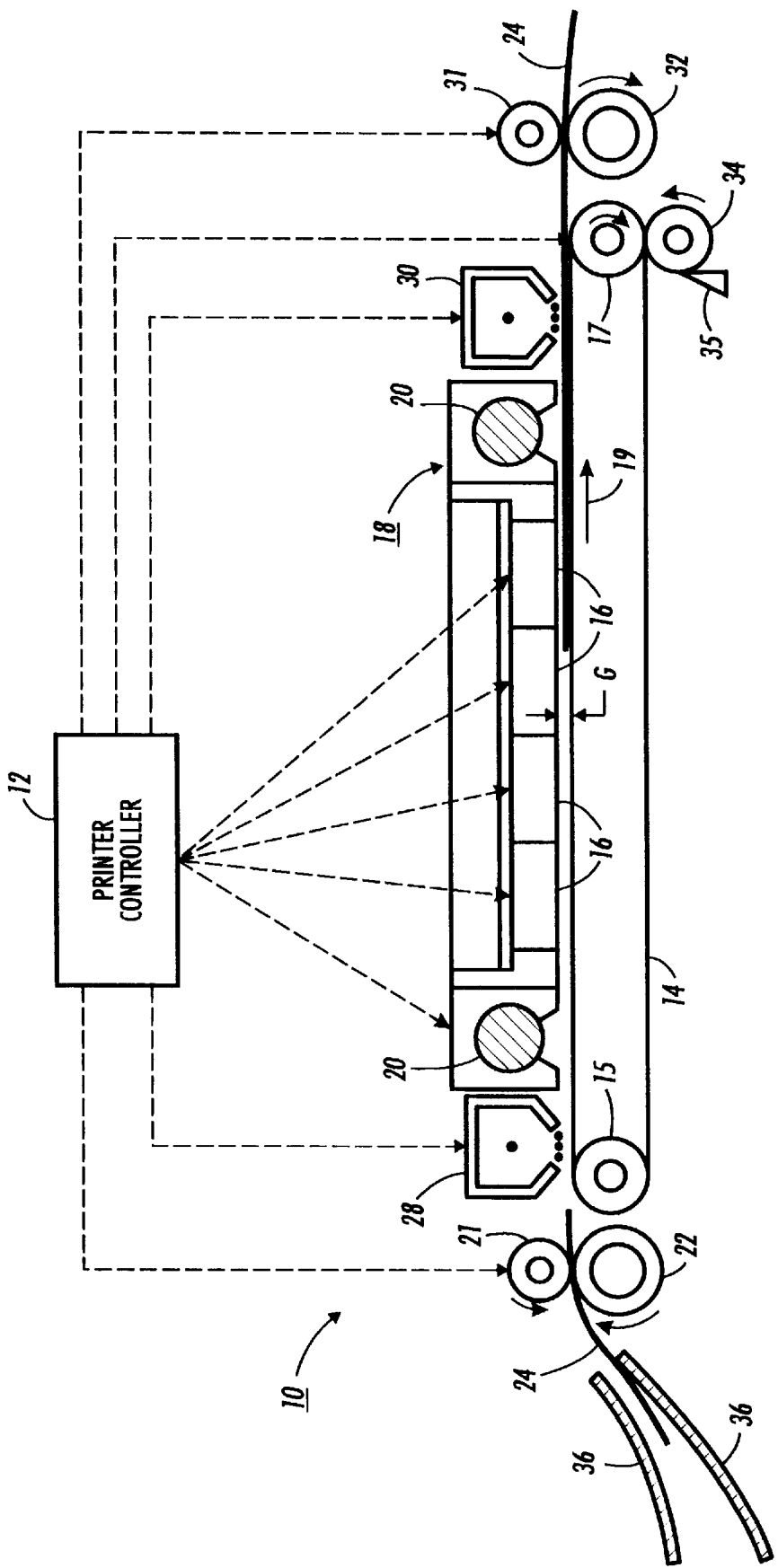
FIG. 1 is a schematic, partially shown side elevation view of an ink jet printer showing a printhead and transport belt utilizing the present invention.
Figure 2:
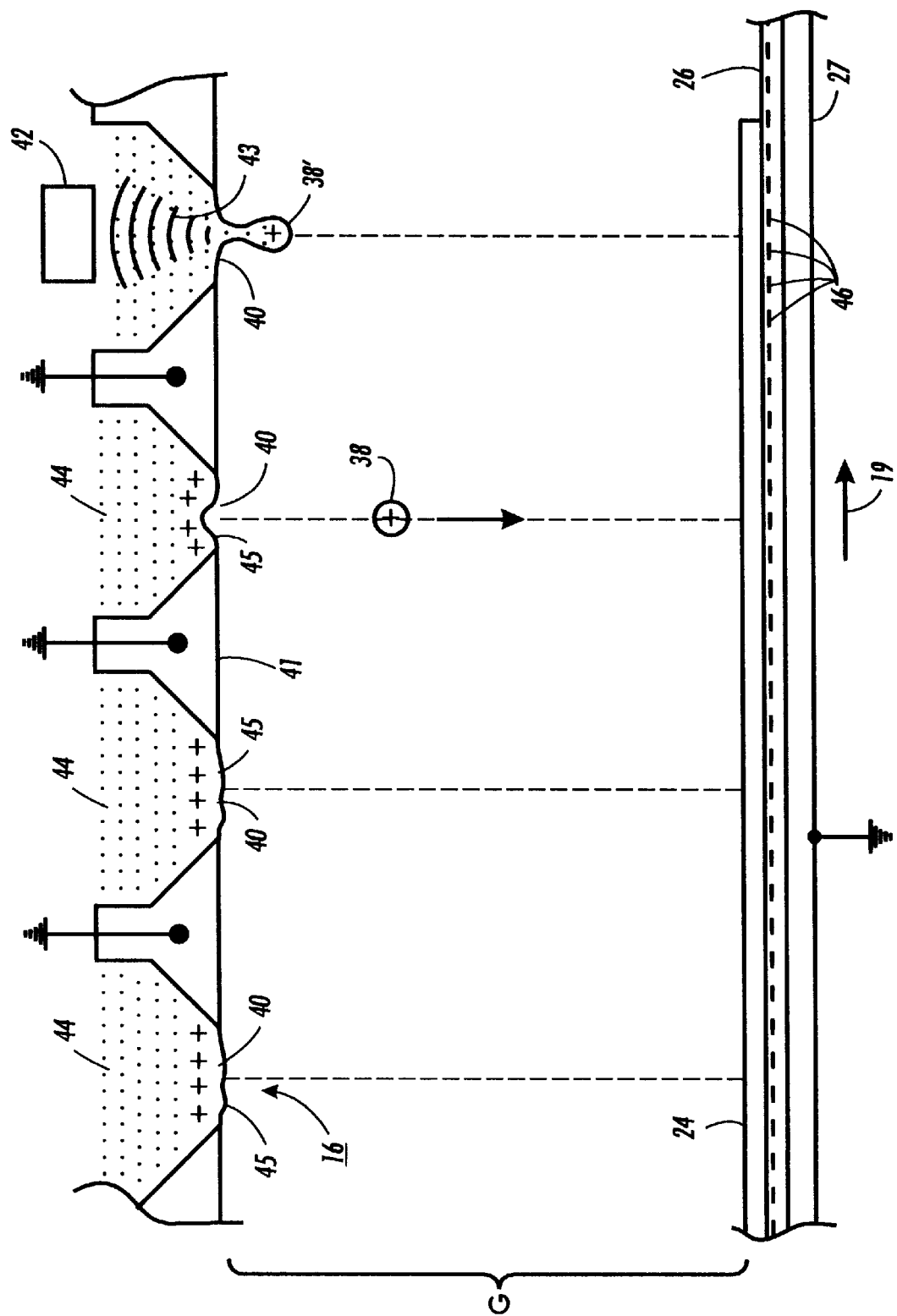
FIG. 2 is a schematic representation of the invention showing ink droplets being accelerated toward a recording medium by the electrostatic attractive force tacking the recording medium to the transport belt.
Figure 3:
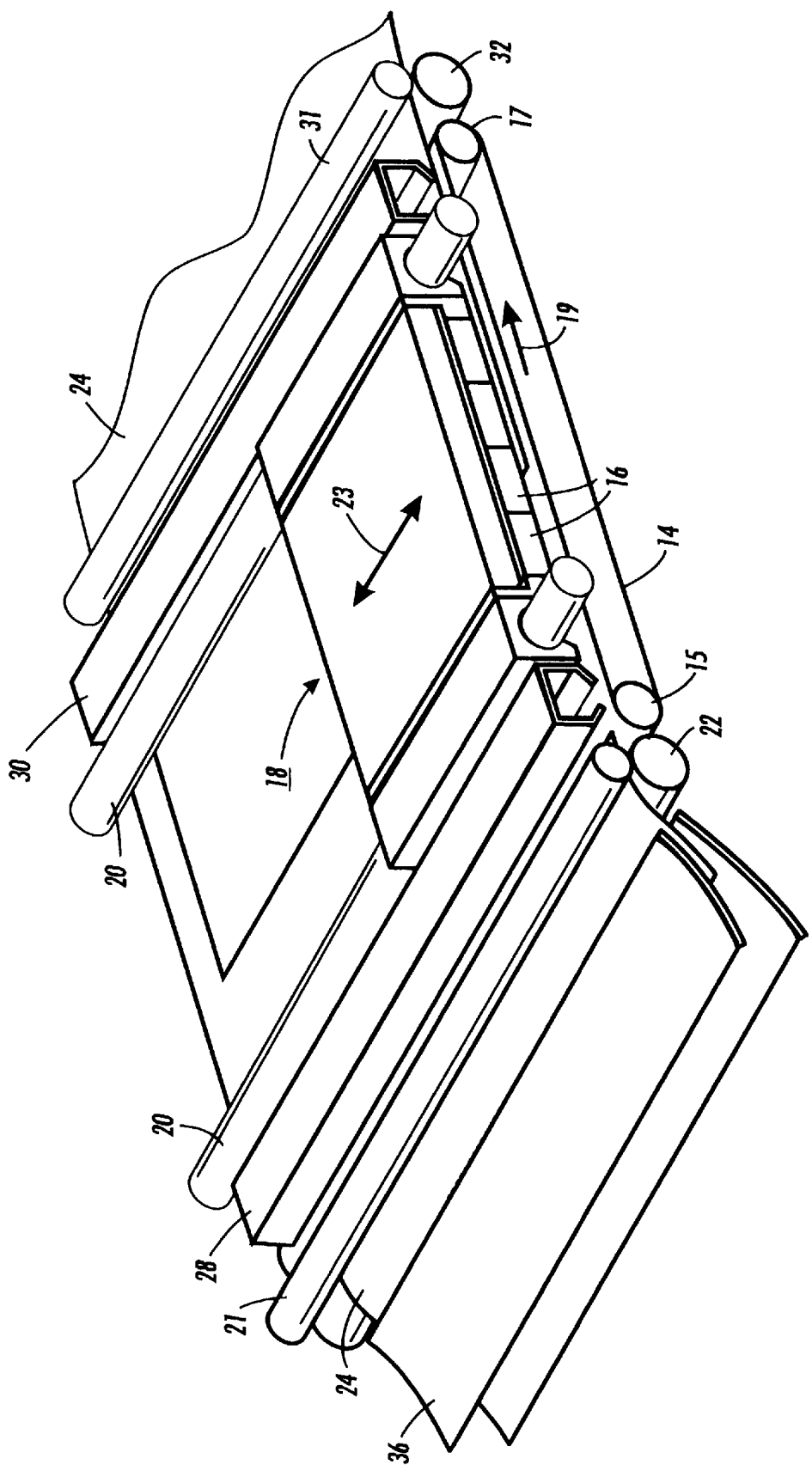
FIG. 3 is an isometric view of the printer of FIG. 1 showing the electrostatically charged transport belt and recording medium thereon.

In FIGS. 1 and 3, a partially shown side elevation view and a partially shown isometric view of an ink jet printer 10 are depicted, respectively. The printer has a printer controller 12, a transport belt 14 entrained on idler roller 15 and drive roller 17 for movement in the direction of arrow 19, a plurality of ink jet printheads 16 mounted on a carriage 18 which is translatable along guide rails 20 in a direction orthogonal to the direction of the printhead carriage, as shown in FIG. 3 by arrow 23, and a pair of input feed rollers 21,22 forming a nip therebetween for registering and feeding a recording medium 24, such as a sheet of paper, on to the transport belt. The transport belt has an outer dielectric surface 26 and an inner conductive surface 27 which contacts the idler and drive rollers 15,17, as shown in FIG. 2. The printer has a first corona generating device 28, preferably a DC scorotron, for applying an electrostatic tacking charge on the dielectric surface of the transport belt, which is located at the end of the transport belt adjacent the feed rollers 21,22, and a second corona generating device 30, preferably an AC scorotron, for detacking the recording medium, which is located at the other end of the transport belt. A pair of output feed rollers 31,32 drive the recording medium from the transport belt, so that the recording medium is always in the grip of either the feed rollers or the output rollers. A biased roller 34 with a cleaning doctor blade 35 contacts the transport belt, after the recording medium is detacked from it and is in the grip of the output rollers, in order to remove any contaminating particles or debris attracted to the transport belt by the electrostatic tacking charge.

The printer controller 12 directly communicates with and controls the input feed rollers 21,22, which accepts the recording medium from the input tray (not shown) and after exiting from a pair of guides 36 which direct the recording medium to the input feed rollers, and the movement of the transport belt via a stepper motor (not shown). In the following preferred embodiment, the ink jet printheads are translatable, partial width printheads, one printhead for each of four colors, and the transport belt is held stationary by the printer controller while the printheads print a swath of an image and then is stepped a distance equal to the height of the printed swath or a portion thereof until the entire image is printed. However, other embodiments are possible, including an embodiment in which the printheads are pagewidth and fixed and the transport belt moved relative to the printheads at a constant velocity.

The printer controller 12 controls the ink droplet ejectors 42 (see FIG. 2) in each of the printheads. In the following embodiment of the invention, an acoustic ink jet printhead is used with acoustic ink droplet ejectors, although other types of printheads are possible, including thermal ink jet and piezoelectric ink jet droplet ejectors. The printer controller directly communicates with and controls the acoustic ink droplet ejectors 42 formed in the printheads and the first and second corona generating devices 28,30.

Referring to FIG. 2, a schematic representation of the invention is shown in an enlarged cross-sectional view of a portion of the printhead 16, the transport belt 14 with the recording medium 24 thereon, and the 1 mm gap "G" between the face 41 of the printhead having the apertures 40 therein and the transport belt. The printhead and the conductive back surface 27 of the transport belt can both be grounded. The printhead 16 ejects ink droplets 38 through the printhead apertures 40 directed toward the recording medium 24 using acoustic ink droplet ejectors 42. Each acoustic ink droplet ejector includes a piezoelectric transducer of RF source which creates a sound wave 43 in the ink 44 stored in the printhead. A lens (not shown), such as a Fresnel lens, focuses the sound wave at the ink surface 45 in the apertures 40. The acoustic pressure at the ink surface 45 causes an ink droplet 38 to form which has a charge induced therein by the electrostatic tacking charge 46 placed on the dielectric surface 26 of the transport belt 14. The fully formed and ejected droplet 38 is directed and propelled towards the recording medium 24 at a velocity of about 4 meters/second initially, but the induced charge accelerates the droplet toward the electrostatically charged transport belt. Thus, the electrostatic tacking charge on the dielectric surface of the transport belt concurrently tacks the recording medium to the transport belt and provides the electrostatic field to induce charges on the ink droplets which increases the droplet velocity and thereby enhances droplet deposition accuracy and improves print quality of the printed images.

Positive ions in the aqueous based ink congregate at the ink surface 45 in response to the high electrostatic negative potential of approximately –1,200 volts placed on the dielectric surface 26 by the DC scorotron 28 (shown in FIGS. 1 and 3). The electrostatic charge on the dielectric surface of the transport belt sustains a field in excess of 1.2 V/$\mu$m across the printing gap G defined as the distance between the printhead face having the apertures 40 and the transport belt 14. The induced charge effect on the ink exposed in the apertures is enhanced by the protrusion 38' of the ink during the formation of a droplet 38. Therefore, when each ink droplet 38 separates from the ink surface 45, the ink droplet 38 is positively charged on the order of 30–60 fC for aqueous based inks and is strongly attracted toward recording medium, which is electrostatically tacked or held on the dielectric surface of the transport belt. As the ink droplet 38 travels the 1 mm distance of gap G separating the printhead aperture face 41 and the transport belt 14, the droplet is accelerated to approximately 3 or 4 times its initial ejection velocity or about 12–16 m/sec. The increase in droplet velocity reduces errors in droplet placement on the recording medium by minimizing droplet deflections caused by transverse effects or forces, such as airflows, fringing fields, and skewed ejection angles.

Figure 4:
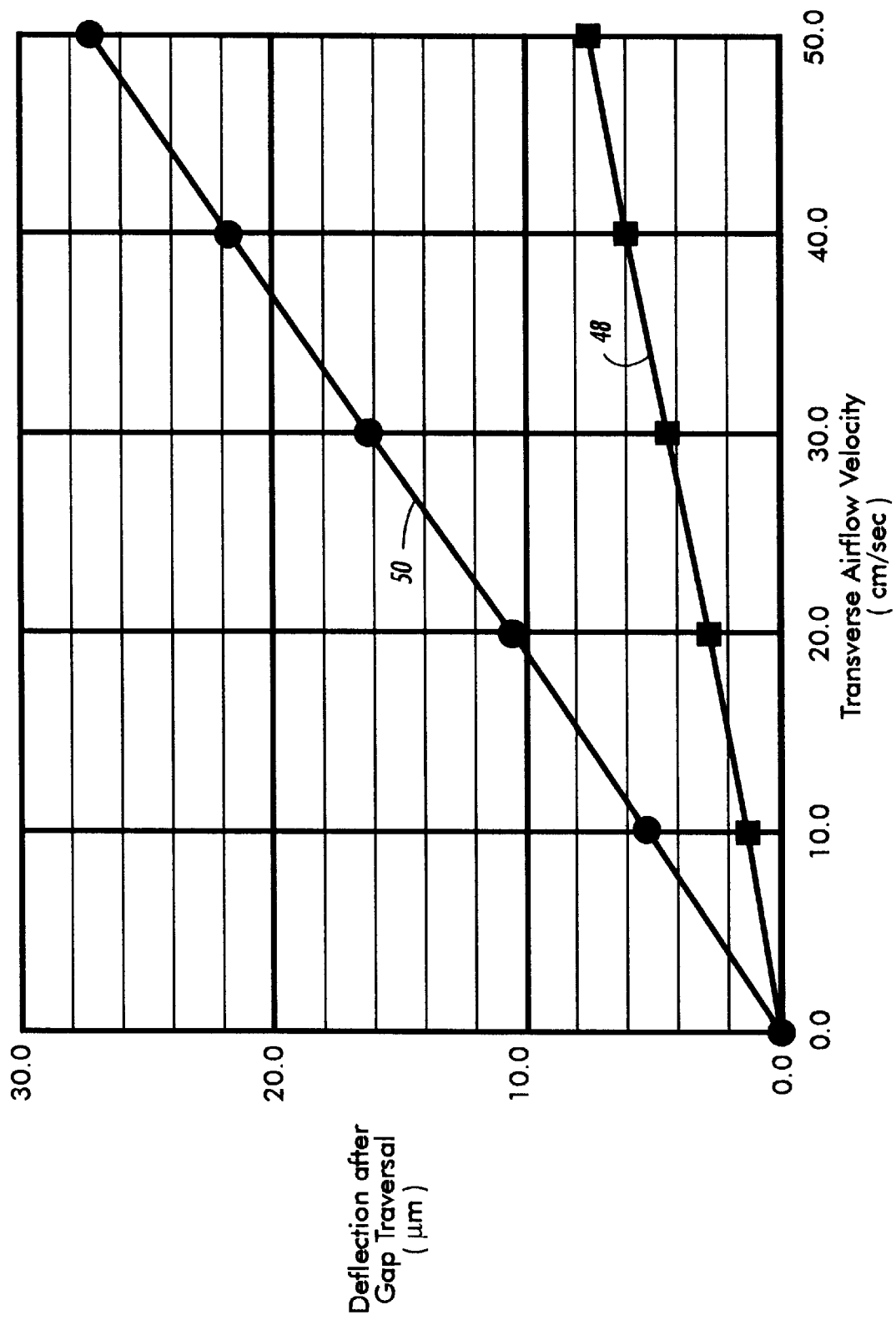
FIG. 4 is a plot of droplet deflection versus transverse airflow for charged and uncharged droplets.

When droplet deflection versus transverse airflow is plotted for a 2 pL ink droplet traveling across a gap of 1 mm, one with induced charge and one without charge, for transverse airflows having a velocity varying from 0 to 50 cm/sec, plotted curve 48 for the charged droplet and plotted curve 50 for the droplet without charge show that a four-fold reduction in droplet deflection is achieved, as shown in FIG. 4, as a function of various levels of transverse airflow velocities. More importantly, the induced charge on the droplets guarantees that the droplets and satellites of all sizes do not fall back on the printhead aperture face 41, but instead travel on and be attracted to the recording medium, thus eliminating one well known source of printhead contamination.

The voltage bias across the printing gap G results in a net charge on the ejected ink droplets which have electrical conductivity approximately that of aqueous inks. This method of inductive charging will work for other non-aqueous inks, provided that the electrical conductivity is such that the charging time constant is a fraction of the hydrodynamic free surface relaxation time.

Electrostatic field enhancements to the acoustic ink jet printer 10 involve two aspects, viz., the tacking of the recording medium 24 to the transport belt 14 using, in the preferred embodiment, a DC scorotron 28 and the use of a biased voltage between the printhead 16 and transport belt to inductively charge the ink droplet 38 prior to ejection by the acoustic droplet ejector 42. The tacking provides an alternative to vacuum hold-down which have been observed to result in printed artifacts in the printed regions of the recording medium corresponding to the suction orifices in the vacuum platens. Adding a layer of dielectric material between a conductive backing and the recording medium allows charge to be deposited which produces electrostatic pressure on the recording medium. Analytic calculations, which have been experimentally verified, indicate that the electrostatic pressure varies with the level of charging and an electrostatic positive or negative charge of 12.0 nC/cm$^2$ has been selected for the preferred embodiment to provide an electrostatic pressure of 1.5 to 2.0 gm/cm$^2$. After printing, the recording medium is detacked using an AC scorotron 30. This manner of tacking is distributed over the area of the recording medium and can be implemented for both the transport belt of the preferred embodiment, a drum transport arrangement, or a flat platen arrangement.

Figure 5:
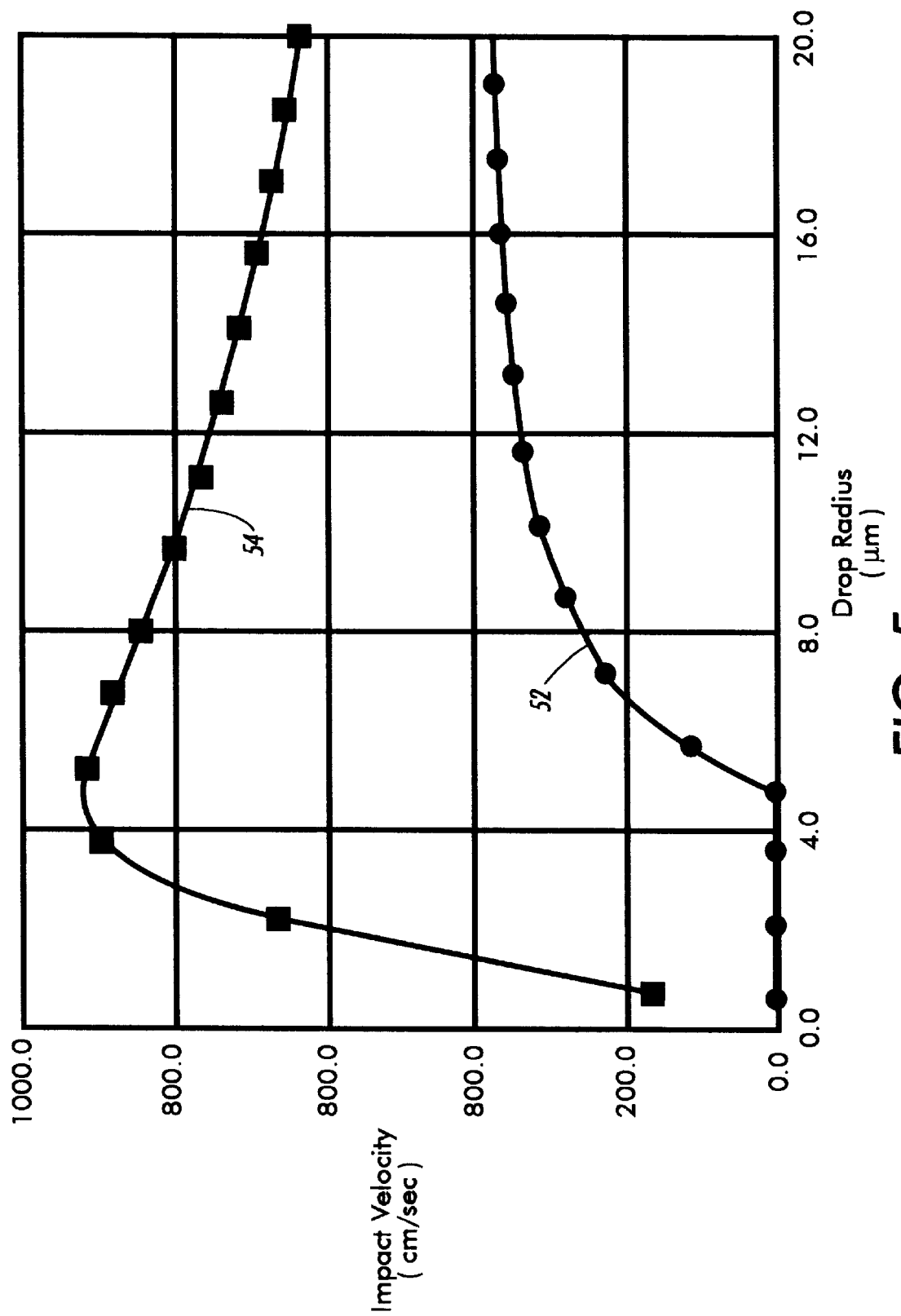
FIG. 5 is a plot of droplet impact velocity on the recording medium as a function of droplet size.

FIG. 5 shows a plot of the impact velocity of droplets having various radii with and without an electrostatic field in the print gap G. Curve 52 shows a plot of the impact velocity of a droplet of varying radius on a recording medium, which does not have an electrostatic field across its print gap. Note that the droplets of curve 52 which have a radius of 4.6 $\mu$m or less do not make it across the gap G to the recording medium, but instead fall back on the printhead aperture face 41. Curve 54 shows a plot of the impact velocity of a droplet of varying radius on a recording medium which has an electrostatic field of 1.5 V/$\mu$m, so that with an electrostatic field assist of at least 1.0 V/$\mu$m, all of the droplets cross the gap independently of their size. The droplets having an electrostatic field, as shown by curve 54, have greatly increased impact velocity, so that transverse forces on the ejected droplets have reduced affect on their directionality. Another advantage of using an electostatic field is that the printhead aperture face is not contaminated by ink spatter or satellites and substantially reducing the need to clean the printhead face.

The DC scorotron 28, shown in FIGS. 1 and 2, is used to spray sufficient charge onto the dielectric surface 26 of the transport belt 14 to provide electrostatic field acceleration of the ejected droplets as well as the tacking force for the recording medium, which is necessary for image printing quality. The charge induced on the droplet 38 will be opposite in polarity to the scorotron charge and will deposit on the recording medium and the air at the air/recording medium interface, when the droplet lands on the recording medium. Depending on recording medium bulk conductivity, the electric field across it, and the relative humidity, the charge from the ink droplet will migrate through the recording medium to the dielectric surface of the transport belt, thus negating an equal amount of charge of the opposite polarity. This neutralizing effect will act to minimize the deflection of incoming droplets, sometimes referred to as 'blooming', caused by previously printed areas.

The deflection of incoming droplets to the recording medium or blooming is caused by the Coulomb repulsion of the droplet by previously printed images on the recording medium and depends on two factors. One factor is the ratio of the projection field or electrostatic attraction field, which is normal to the surface of the recording medium, to the fringing field or transverse field at the edge of the printed and unprinted areas on the recording medium. The larger the ratio, the smaller the blooming effect. Thus, it is desired to minimize the effective voltage on the surface of the recording medium and maximize the electrostatic field in the print gap G which is used for droplet acceleration. In the preferred embodiment, this is achieved by decreasing the thickness of the dielectric layer 26 on the transport belt in order to increase the capacitance. One suitable dielectric layer material is Kapton® and a suitable thickness is about 4 mils or 100 $\mu$m. The transport belt further comprises a conductive underlayer which can be an aluminized coating having a thickness of about 0.5 to 1 mil or 12.5 to 25 $\mu$m. The second factor is the proximity of the charge edge from the surface location of the impact of the droplets. This effect can be minimized by increasing the thickness of the recording medium, thus moving the surface of impact further from the edge of the charged dielectric surface. An appropriate combination of these two factors can reduce the overall blooming by an order of magnitude. In the preferred embodiment, the printhead and conductive layer are both grounded. An electrostatic field of at least 1 V/$\mu$m for a print gap of 1 mm has been determined to efficiently tack the recording medium, such as a 75 $\mu$m thick paper having a dielectric constant $\epsilon_p$ equal to 3. The electrostatic field of at least 1 V/$\mu$m will concurrently tack the recording medium to the dielectric layer of the transport belt and appropriately accelerate the ejected ink droplets with a droplet radius in the range of 6 to 8 $\mu$m and an initial velocity of 4 m/sec to the recording medium with minimized blooming and trajectory deflection. The blooming effects because of repulsion of incoming droplets by previously printed images are reduced by charge migration through the recording medium and subsequent charge cancellation. The polarity of the tacking charge can be selected arbitrarily, but a negative polarity has been chosen for the preferred embodiment, so that the induced droplet charge is positive.

Another benefit of the very large tacking force is that the charged dielectric surface of the transport belt will attract dirt and debris, such as dust and paper fibers, which are then detached during the AC scorotron detacking operation and collected by the biased cleaning roller 34 and doctor blade 35 shown in FIG. 1.

While the invention has been described with reference to specific embodiments, the description of the specific embodiments is illustrative only and is not to be construed as limiting the scope of the invention. Various other modifications and changes may occur to those skilled in the art without departing from the spirit and scope of the invention.

What is claimed is:

1. A method of improving ink droplet placement on a recording medium by an ink jet printer having a printhead with apertures in a printhead face from which ink droplets are ejected and a transport belt, having an outer dielectric layer having a surface confronting the printhead face and an inner conductive layer, spaced from the printhead face by a gap for transporting a recording medium thereon past the printhead apertures, comprising the steps of:

placing an electrostatic tacking charge having a first polarity on selected portions of the transport belt, the electrostatic tacking charge producing an electrostatic attraction field in said gap;

grounding both the printhead and the conductive layer of the transport belt;

feeding a recording medium onto the electrostatically charged portion of the transport belt and into registration therewith for electrostatic tacking of the recording medium thereon;

ejecting ink droplets from the printhead apertures toward the recording medium on said transport belt;

using the electrostatic tacking charge to induce concurrently a charge of opposite polarity on the ejected ink droplets to accelerate the ink droplets across the gap;

permitting the accelerated ink droplets to impact on the recording medium;

migrating the induced charge of the ink droplets which impact on the recording medium through said recording medium to the transport belt, thus negating an equal amount of charge of opposite polarity of said electrostatic tacking charge on the transport belt to minimize the deflection of subsequent incoming droplets and thereby printing an image having improved droplet placement.

2. The method as claimed in claim 1, further comprising the step of:

maximizing a ratio of the electrostatic attraction field in said gap to a fringing field generated at an edge of printed images and unprinted areas on the recording medium in order to minimize the deflection of incoming droplets.

3. The method as claimed in claim 2, wherein the step of maximizing the ratio of the electrostatic attraction field to the fringing field is accomplished when the gap is about 1 mm in distance and the tacking charge provides a field strength in the gap of at least 1 V/$\mu$m; and wherein the dielectric layer of the transport belt has a thickness of about 100 $\mu$m.

4. The method as claimed in claim 3, wherein the recording medium has a predetermined dielectric constant and thickness.

5. The method as claimed in claim 4, wherein the predetermined recording medium dielectric constant is equal to 3 and the predetermined recording medium thickness is 75 $\mu$m.

6. An ink jet printer having improved ink droplet placement on a recording medium during printing of an image thereon, comprising:

a printhead having a printhead face with a plurality of apertures therein which confront the recording medium, a supply of ink in communication with the apertures, and means for ejecting ink droplets from the apertures toward the recording medium;

a transport belt for transporting the recording medium past the printhead face at a fixed distance G therefrom; wherein the transport belt has a dielectric layer on an outer surface of the transport belt which confronts the printhead, and an inner surface which is electrically conductive; and wherein the printhead face and conductive inner surface of the transport belt are grounded;

means for placing an electrostatic tacking charge having a first polarity on selected portions of the dielectric surface of the transport belt, the electrostatic tacking charge producing an electrostatic attraction field in said fixed distance G;

means for feeding the recording medium onto the electrostatically charged portion of the transport belt and into registration therewith for the electrostatic tacking of the recording medium thereon, the electrostatic tacking charge on the transport belt concurrently inducing a charge of a polarity on ejected ink droplets which is opposite to the first polarity of the electrostatic tacking charge, thereby accelerating the ink droplets toward the recording medium; and wherein the recording medium has a predetermined dielectric constant and thickness, so that the induced charges on the ink droplets which impact the recording medium migrate therethrough and neutralize equal amounts of the electrostatic tacking charge on the dielectric surface of the transport belt, so that previously printed images do not deflect incoming ink droplets and affect the incoming ink droplet trajectories.

7. The printer as claimed in claim 6, wherein a ratio of the electrostatic attraction field in said fixed distance G to a fringing field generated at an edge of printed images and unprinted areas on the recording medium is maximized in order to minimize the deflection of incoming droplets.

8. The printer as claimed in claim 7, wherein the ratio of electrostatic attraction field to the fringing field which minimizes the deflection of incoming droplets, an effect known as blooming, is accomplished when the fixed distance G is about 1 mm and defines a gap between the printhead face and the dielectric outer surface of the transport belt; wherein the electrostatic tacking charge provides a field strength in the gap of at least 1 V/$\mu$m; and wherein the dielectric layer of the transport belt has a thickness of about 100 $\mu$m.

9. The printer as claimed in claim 8, wherein the ink has an aqueous base; and wherein the ink droplet has a diameter of 6 to 8 $\mu$m.

10. The printer as claimed claim 9, wherein the ink jet printer has four printheads, one printhead for each of four different colors of ink, the printheads being mounted on a translatable carriage for reciprocation back and forth across the recording medium electrostatically tacked to said transport belt to print multicolor images on the recording medium; wherein the printer has a pair of feed rollers to feed the recording medium onto the transport belt, a means for detacking the recording medium from the transport belt after an image has been printed thereon, and a pair of output rollers to receive and remove the recording medium with the printed image from the transport belt; and wherein the printer has a biased roller with a doctor blade for cleaning contaminating debris from the transport belt attracted thereto by the electrostatic tacking charge on said transport belt.

11. The printer as claimed in 9, wherein the predetermined dielectric constant of the recording medium is equal to 3; and wherein the predetermined thickness of the recording medium is 75 $\mu$m.

\* \* \* \* \*